United States Patent [19]

Pagani

[11] 4,101,281
[45] Jul. 18, 1978

[54] RADIAL-FLOW REACTOR FOR THE SYNTHESIS OF AMMONIA WITH PRODUCTION OF HIGH THERMAL-LEVEL STEAM

[75] Inventor: Giorgio Pagani, Milan, Italy

[73] Assignee: Snamprogetti S.p.A., Milan, Italy

[21] Appl. No.: 705,013

[22] Filed: Jul. 14, 1976

[30] Foreign Application Priority Data

Jul. 15, 1978 [IT] Italy ................................ 25421 A/75

[51] Int. Cl.² .............................. B01J 8/04; B01J 3/00; C01C 1/04; F22B 1/18
[52] U.S. Cl. .................................. 23/288 K; 23/289; 423/360; 122/4 D
[58] Field of Search ............. 23/289, 288 K; 423/359, 423/360, 361; 122/4 D

[56] References Cited

U.S. PATENT DOCUMENTS

| | | | |
|---|---|---|---|
| 3,372,988 | 3/1968 | Hansen | 23/289 UX |
| 3,477,828 | 11/1969 | Schulze et al. | 23/289 |
| 3,701,635 | 11/1972 | Staarmann et al. | 23/289 |
| 3,753,662 | 8/1973 | Pagani et al. | 23/289 |

*Primary Examiner*—Morris O. Wolk
*Assistant Examiner*—Roger F. Phillips
*Attorney, Agent, or Firm*—Morgan, Finnegan, Pine, Foley & Lee

[57] ABSTRACT

In an ammonia synthesis column, the combination of a tube bundle heat exchanger and a boiler with two superposedly arranged catalyst beds permits to recover considerable amounts of reaction heat, the flow of the gases being reacted running in a radial direction.

3 Claims, 2 Drawing Figures

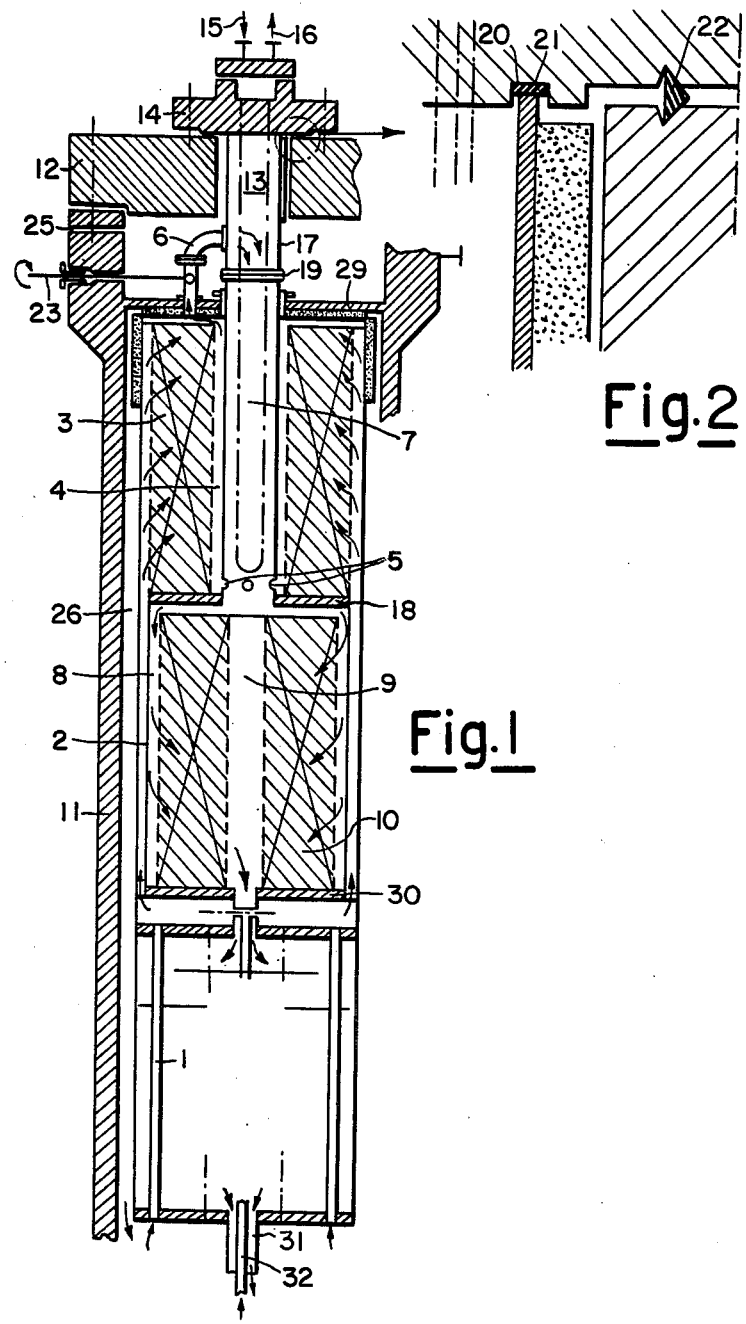

RADIAL-FLOW REACTOR FOR THE SYNTHESIS OF AMMONIA WITH PRODUCTION OF HIGH THERMAL-LEVEL STEAM

This invention relates to a radial-flow reactor for the synthesis of ammonia with the production of steam having a high thermal level.

More particularly, this invention relates to a radial-flow having two catalyst beds for the synthesis of ammonia, with the production of steam having a high thermal level.

As the present specification proceeds, reference will be had to such a reactor, even though, obviously, the reactor may have more than two beds.

Radial-flow reactors for the synthesis of ammonia are known. They are composed of a vertical cylindrical vessel, in the interior of which two catalyst beds are arranged within toroidal containers having foraminous walls. They operate as follows : a part of the synthesis gases, after having been preheated in the interior of the reactor at the expense of the heat of reaction, enters the first bed and flows therethrough radially from the interior towards the exterior. The reaction products and the unreacted gases emerging from the first bed are admixed with the remaining portion of the synthesis gases in an annular zone which is confined between the external cylindrical vessel and the toroidal foraminous containers mentioned hereinabove. The mixture then enters the second catalyst bed and flows therethrough radially from the exterior towards the interior. The reacted gases are then caused to flow through a heat-exchanger which is intended partially to preheat the gas stream to be sent to the first catalyst bed.

The radial-flow reactors made according to the prior art afford satisfactory yields of ammonia, but have the defect of lowering the thermal level of the heat of reaction which could be recovered, and said recovery must, at any rate, be carried out outside the reactor.

It has been found that it is possible to recover the heat of reaction in a manner which is both simple and cheap, with concurrent production of steam having a high thermal level while maintaining the principle of the radial flow reactor unaltered.

An object of the present invention is to provide a radial-flow reactor for the synthesis of ammonia, with two catalyst beds, which contains in its interior a boiler for the production of steam having a high thermal level.

The subject-matter of the present invention will be described with the aid of the accompanying drawings. The embodiments illustrated in these drawings are exemplary and are not intended to limit the invention in any wise.

BRIEF DESCRIPTION OF THE DRAWINGS

FIG. 1 is an elevation, in section, of a radial flow reactor embodying my invention; and FIG. 2 is an enlarged detail, in section, illustrating means for sealing a boiler in the reactor container.

Reference will be had, at the outset, to FIG. 1. The feed gas, preheated in the tubes of the exchanger 1 (only one tube has been shown in the drawing) flows, through the annular-cross-section duct 2, into the first catalyst bed 3 and flows through the same radially and the reaction takes place. The reaction products and the unreacted gas flow through the annular-cross-section duct 4; part thereof emerging through the openings 5 and the remainder flowing through the duct 6 into the container of the tubular boiler 7.

The two streams are combined at the bottom of the tubular boiler 7 and they flow therefrom through the second catalyst bed 10 via the second annular-cross-section duct 8. The reactants and the reaction products flow radially through the second bed and are collected in the central duct 9 of the second bed, from which they emerge and sweep the outer surfaces of the tubes of the exchanger 1.

The radial-flow reactor according to this invention comprises the following component parts:

An outer shell 11, of alloyed steel, is provided with a lid 12 which has, at its top end, a central bore through which the boiler 13 is caused to pass. Boiler 13 is formed of a tube bundle of the "U" or "bayonet" type, and is directly flanged onto the lid 12 of the reactor by means of a flange 14 and thus it can easily be withdrawn. The water for the boiler tubes enters through the inlet 15 and the steam emerges from the nozzle 16. The container 17 of the boiler is a cylindrical tube which is welded at its bottom portion to the annular plate 18 and is preferably equipped with a thermal expansion joint 19. The length of the container is so defined as, when fastening the lid to the boiler, the top edge of the container 17 is compressed into a specially provided groove 20 formed on the bottom face of the flange 14 of the boiler, thus providing an internal seal between the cold gas which sweeps from the outside the wall of the container and the hot gas in the interior of the boiler.

In FIG. 2 the seal between the container and the flange is diagrammatically shown, the container edge being inserted in the groove 20 of the flange equipped with sealing material 21. The tight seal towards the outside is then afforded by a lens-shaped gasket 22.

The boiler is then equipped with a regulation valve 23 which is operated from the exterior and permits the rate of flow of the gas sent to the boiler to be varied. The container of the boiler is equipped at its bottom end with a set of holes 5 which allow the flow of a portion of the gas when the valve is fully open. The cold gas is fed to the reactor via the tube 25 in the area above the catalyst and, therefrom, it flows through the annular duct 26 into the tubes of the heat exchanger 1 and, from the latter, to the first bed and subsequently to the second, as outlined above.

The hot gas produced by the reaction flows into the boiler through the piping 6 which is also preferably equipped with a thermal expansion joint.

In a toroidal arrangement around the boiler and in the interior of the area confined by the outer surface of the boiler vessel and by the cylindrical wall which is coaxial with the outer shell, to confine the annular-cross-sectional zone 26 through which the cold gas flows, there is arranged the first catalyst bed 3. The latter is properly spaced apart both from the outer surface of the boiler vessel and from the inner surface of the abovementioned cylindrical wall. The first catalyst bed 3 lies on the plate 18 abovementioned and is spaced apart from the top plate 29 through which the tube 6 is passed, which feeds the hot gases to the boiler.

The top plate 29, which is annular, is fastened externally to the inner wall of the outer shell and matches internally the boiler vessel. The top plate 29 is spaced from the lid 12 in such a way as to allow sufficient room for passing the tube 6, the valve 23 and the feed tube 25.

The second catalyst bed 10 is arranged beneath the first one and is separated from same, having also a toroidal outline: it rests on the annular supporting plate 30. It is properly spaced from the supporting plate of the first bed and from a second cylindrical wall which is coaxial with and parallel to the preceding one and has an inside base diameter equal to the diameter of the supporting plate of the first catalyst bed. In the empty central zone 9 of the second catalyst bed, the reacted gas flows which then goes to sweep the outer surfaces of the tubes of the exchanger 1, the latter being of conventional make and placed beneath the second catalyst bed, said exchanger having two tube plates connected to the first coaxial cylindrical wall, the latter being thus the shell of the exchanger.

The reacted gas emerges from the exchanger through the annular-cross-section duct 31. The duct 32 at the base of the reactor is intended for feeding the hot synthesis gas during the starting stage. Once the reactor has been primed and has reached its steady state, the reactants are fed through the tube 25.

It should be noted that each of the two catalyst beds is enclosed between two cylindrical foraminous walls, is closed at its top end by an annular plate, and is closed at the bottom by the supporting plate of the respective beds.

Both the top plate 29 and the supporting plate 30 for the second catalyst bed are foraminous in the vicinity of their greatest diameter so as to permit the gas flow.

What I claim is:

1. A radial-flow reactor for the synthesis of ammonia with the production of steam having a high thermal level, comprising a generally vertically extending outer cylindrical shell of alloyed steel;

a lid having a central bore mounted on the top of said shell;

a top plate having a central bore fixed to the inner wall of said shell at a point spaced below said lid;

a first coaxial cylinder mounted in said shell below the top plate, adjacent the bottom surface of said top plate, said first cylinder having its outer wall spaced from the inner wall of the shell to provide a first duct of annular cross-section, said first duct being in flow communication with the space in said outer shell between said lid and said top plate through the outer circumferential portion of said top plate;

a boiler of the U or bayonet tube bundle type extending through said bores into the shell;

a flange having an annular groove in its lower face connecting the boiler to the lid;

an intake nozzle coupled, through said flange, to the inlet of said boiler for delivering water to the boiler;

a discharge nozzle coupled, through said flange, to the outlet of said boiler for discharging steam from the boiler;

a first annular plate fixed to the inner wall of said first coaxial cylinder;

a cylindrical tube enclosing said boiler having its lower end fixed to said first annular plate and its upper end extending into and sealingly engaged within said groove in the flange;

a first catalyst bed of toroidal shape supported by said first annular plate;

a first pair of foraminous coaxial cylinders forming the side walls of said first catalyst bed, having their lower ends supported by said first annular plate and mounted in the shell to provide an internal duct of annular cross-section between the inner of said first pair of foraminous coaxial cylinders and said cylindrical tube, the top portion of said first catalyst bed being closed by an annular plate disposed between the inner of said first pair of foraminous cylinders and said first coaxial cylinder;

a second catalyst bed of toroidal shape;

a second annular plate fixed to the inner wall of said first coaxial cylinder and adapted to support the second catalyst bed below the first catalyst bed;

a second coaxial cylinder extending between said first and second annular plates;

a second pair of foraminous coaxial cylinders forming the side walls of the second catalyst bed, having their lower ends supported by said second annular plate and mounted in the shell to provide a second duct of annular cross-section between the outer of said second pair of foraminous cylinders and the inner surface of said second coaxial cylinder, said second duct being in flow communication with said boiler; the top of said second pair of foraminous cylinders being closed by a circular plate over the outer of said second foraminous cylinders;

a plurality of openings formed near the lower end of said boiler-enclosing tube to provide flow communication between said internal and second annular ducts;

a central cylindrical duct formed by the inner of said second pair of foraminous cylinders, said central cylindrical duct being in flow communication with a central bore in said second annular plate;

an additional duct of annular cross-section formed between the inner wall of said first coaxial cylinder and both the outer wall of the outer of said first pair of foraminous cylinders and the outer wall of the second coaxial cylinder;

a tube bundle heat exchanger supported in the shell below said second catalyst bed, the tubes of said heat exchanger providing flow communication between said first annular duct and said additional annular duct;

a tube extending through said top plate, said tube providing flow communication between said internal annular duct and the boiler;

valve means in said tube for controlling flow therethrough;

an inlet adapted to admit synthesis gas to the space between the lid and said top plate;

conduit means providing flow communication between the central cylindrical duct in the second catalyst bed, through said second annular plate and into said heat exchanger for introducing reacted gas from said second catalyst bed into said heat exchanger to sweep the outer surfaces of the heat exchanger tubes;

a generally cylindrical exit duct affixed to the bottom of said reactor for exhausting the reacted gas;

a second tube coaxial with said exit duct, said second tube extending through said heat exchanger and being in flow communication with said additional annular duct, through said conduit means, for supplying a starter gas to said reactor until said reactor has reached its steady state, such that cold gas admitted through said inlet to the space between said lid and said top plate flows into said first annular duct and passes through the tubes of said heat exchanger, through said additional annular duct and into said first catalyst bed, whereafter some reactant products of the first catalyst bed flow through said tube, from said internal annular duct, into said boiler-enclosing cylindrical tube and into said second annular duct while the remaining reactant products flow directly from said internal annular duct into said second annular duct which admits the reactant products of the first catalyst bed into said second catalyst bed to produce reacted gas flowing into said central cylindrical duct from which said conduit means introduces the resultant gas into said heat exchanger for sweeping the outer surfaces of the heat exchanger tubes and subsequent exiting through said exit duct.

2. A reactor according to claim 1, characterized in that the boiler includes a thermal expansion joint.

3. A reactor as claimed in claim 2, characterized in that the tube which connects the first catalyst bed with the boiler includes a thermal expansion joint.

* * * * *

UNITED STATES PATENT OFFICE
CERTIFICATE OF CORRECTION

Patent No. 4,101,281                Dated July 18, 1978

Inventor(s) Giorgio Pagani

It is certified that error appears in the above-identified patent and that said Letters Patent are hereby corrected as shown below:

ON THE FIRST PAGE

Under I.N.I.D. Code number [30] (Foreign Application Priority Data), "Jul. 15, 1978 [IT]" should be --Jul. 15, 1975 [IT]--.

*Signed and Sealed this*

*Thirteenth* Day of *February 1979*

[SEAL]

Attest:

RUTH C. MASON
*Attesting Officer*

DONALD W. BANNER
*Commissioner of Patents and Trademarks*